US011229847B2

(12) United States Patent
Yoshikawa et al.

(10) Patent No.: US 11,229,847 B2
(45) Date of Patent: Jan. 25, 2022

(54) GAME CONTROL METHOD, GAME SERVER, AND PROGRAM

(71) Applicant: GREE, INC., Tokyo (JP)

(72) Inventors: Tsuyoshi Yoshikawa, Tokyo (JP); Tomohiro Tsukihara, Tokyo (JP); Norikazu Kato, Tokyo (JP); Tomoki Yasuhara, Tokyo (JP)

(73) Assignee: GREE, INC., Tokyo (JP)

( * ) Notice: Subject to any disclaimer, the term of this patent is extended or adjusted under 35 U.S.C. 154(b) by 31 days.

(21) Appl. No.: 16/778,404

(22) Filed: Jan. 31, 2020

(65) Prior Publication Data

US 2020/0164277 A1 May 28, 2020

Related U.S. Application Data

(63) Continuation of application No. 16/531,536, filed on Aug. 5, 2019, now Pat. No. 10,583,365, which is a
(Continued)

(30) Foreign Application Priority Data

Jun. 21, 2012 (JP) ................. 2012-140213

(51) Int. Cl.
*A63F 13/69* (2014.01)
*A63F 13/35* (2014.01)
*A63F 13/79* (2014.01)

(52) U.S. Cl.
CPC .............. *A63F 13/69* (2014.09); *A63F 13/35* (2014.09); *A63F 13/79* (2014.09); *A63F 2300/575* (2013.01); *A63F 2300/609* (2013.01)

(58) Field of Classification Search
CPC .......... A63F 13/30; A63F 13/55; A63F 13/67; A63F 13/69; A63F 13/79; A63F 13/798
See application file for complete search history.

(56) References Cited

U.S. PATENT DOCUMENTS

| 4,643,454 A | 2/1987 | Ondis |
| 7,357,718 B2 | 4/2008 | Yamaoka et al. |

(Continued)

FOREIGN PATENT DOCUMENTS

| JP | 2001218981 A | 8/2001 |
| JP | 2001259228 A | 9/2001 |

(Continued)

OTHER PUBLICATIONS

Mar. 23, 2021 Office Action issued in Japanese Patent Application No. 2020-027055.
Wiki. "Dream C Club Zero" <https://w.atwiki.jp/dclubzero/pages/51.html> (Feb. 22, 2012).

(Continued)

*Primary Examiner* — James S. McClellan
(74) *Attorney, Agent, or Firm* — Oliff PLC

(57) ABSTRACT

A game control method, game server, and program can increase variations on methods for acquiring items, increase the predictability of acquisition of an item with a high rarity value or the like, and heighten interest in the game. Included are the steps of presenting a communication terminal, connected over a communication line, with acquirable item information that, for each item type, includes a total count and an acquisition count or a non-acquisition count of items when receiving, from the communication terminal, a request to present information related to items acquirable by the communication terminal, determining an item to provide to the communication terminal when receiving an item acquisition request from the communication terminal, and changing the acquirable item information when receiving a reset request from the communication terminal.

18 Claims, 10 Drawing Sheets

Related U.S. Application Data continuation of application No. 16/053,149, filed on Aug. 2, 2018, now Pat. No. 10,413,832, which is a continuation of application No. 14/409,219, filed as application No. PCT/JP2013/003899 on Jun. 21, 2013, now Pat. No. 10,076,708.

(56) References Cited

U.S. PATENT DOCUMENTS

| | | | |
|---|---|---|---|
| 8,147,316 | B2 | 4/2012 | Arezina et al. |
| 8,352,542 | B2 | 1/2013 | Stroffolino |
| 8,843,853 | B1 | 9/2014 | Smoak et al. |
| 9,511,285 | B2 | 12/2016 | Hawkins, III |
| 2003/0008710 | A1 | 1/2003 | Yamaoka et al. |
| 2004/0259642 | A1 | 12/2004 | Tanaka et al. |
| 2005/0282634 | A1* | 12/2005 | Yamada ............ A63F 13/31 463/39 |
| 2006/0082068 | A1* | 4/2006 | Patchen ............ A63F 13/798 273/430 |
| 2009/0051114 | A1 | 2/2009 | Robbers et al. |
| 2009/0247260 | A1 | 10/2009 | Goto et al. |
| 2011/0124415 | A1 | 5/2011 | Shimono |
| 2011/0257442 | A1* | 10/2011 | Horton ............ B01J 8/0457 568/885 |
| 2011/0275442 | A1 | 11/2011 | Hawkins, III |
| 2011/0294558 | A1 | 12/2011 | Kim |
| 2012/0004038 | A1 | 1/2012 | Van Luchene |
| 2012/0129590 | A1 | 5/2012 | Morrisroe et al. |
| 2012/0202575 | A1 | 8/2012 | Matsuno |
| 2013/0337906 | A1 | 12/2013 | Ikeda |
| 2014/0038716 | A1* | 2/2014 | Endo ............ A63F 13/12 463/31 |
| 2014/0143687 | A1 | 5/2014 | Tan et al. |

FOREIGN PATENT DOCUMENTS

| | | | |
|---|---|---|---|
| JP | 2001-353371 | A | 12/2001 |
| JP | 2002-236773 | A | 8/2002 |
| JP | 2002-366852 | A | 12/2002 |
| JP | 2003-016333 | A | 1/2003 |
| JP | 2003-019356 | A | 1/2003 |
| JP | 2003-154172 | A | 5/2003 |
| JP | 2003260266 | A | 9/2003 |
| JP | 2005-318995 | A | 11/2005 |
| JP | 2007117656 | A | 5/2007 |
| JP | 2008-220984 | A | 9/2008 |
| JP | 2011067534 | A | 4/2011 |
| JP | 2013-027477 | A | 2/2013 |
| JP | 2014000103 | A | 1/2014 |

OTHER PUBLICATIONS

IT Media. "The Next Move for Social Games that Have Lost Complete Gacha" <https://web.archive.org/web/20120606104640/https://nlab.itmedia.co.jp/nl/articles/1205/21/news089.html> (Jun. 6, 2012).
Sep. 10, 2013 International Search Report issued in Application No. PCT/JP2013/003899.
Mar. 11, 2014 Japanese Office Action issued in Application No. 2013-544606.
Mar. 11, 2014 Japanese Office Action issued in Application No. 2014-007086.
Jun. 10, 2014 Japanese Office Action issued in Application No. 2013-544606.
Sep. 16, 2014 Japanese Office Action issued in Application No. 2014-142613.
Nov. 19, 2013 Japanese Office Action issued in Application No. 2013-544606.
Social Game Review 7: Social Gacha's payment encouragement scheme has overwhelmed network games [online], GameCast iPhone, Feb. 11, 2012, (with partial translation).
"Power Pro Kun Pocket 14 Official Complete Guide", Enterbrain, 1st Edition, p. 157, Feb. 22, 2012, (with partial translation).
"Dengeki!! Yoen Kunoichi", Appli Fan, Cosmic Publishing, vol. 2, pp. 116-117, Apr. 15, 2012.
"Wonder Life Special, Nintendo Official Guidebook, Pokemon XD, Gale of Darkness, Dark Lugia", Shogakukan Inc., 1st Edition, p. 152, Oct. 1, 2005.
Feb. 3, 2015 Office Action issued in Japanese Patent Application No. 2014-208126.
Dec. 22, 2015 Office Action issued in Japanese Patent Application No. 2015-131303.
Oct. 4, 2016 Office Action issued in Japanese Patent Application No. 2016-051444.
Dec. 1, 2016 Office Action Issued in U.S. Appl. No. 14/409,219.
Feb. 21, 2017 Office Action issued in Japanese Patent Application No. 2016-051444.
Nintendo DREAM August issue separate volume, Tomodachi Collection, Shima No Seikatsu Mankitsu Guide, Mainichi Communications Inc., vol. 14, No. 8, p. 19, 2009.
May 9, 2017 Office Action issued in Japanese Patent Application No. 2016-051444.
Saka Tsuku DS Touch and Direct Perfect Guide, Enterbrain, Inc., First Version, pp. 74-76, Jan. 8, 2009.
Aug. 25, 2017 Office Action issued in U.S. Appl. No. 14/409,219.
Feb. 9, 2018 Office Action issued in U.S. Appl. No. 14/409,219.
Jun. 26, 2018 Office Action issued in Japanese Patent Application No. 2017-126020.
May 25, 2018 Notice of Allowance issued in U.S. Appl. No. 14/409,219.
Sep. 18, 2018 Office Action issued in Japanese Patent Application No. 2017-126020.
Media Works Inc. "Yoshi's Island DS, The Complete Guide". 3rd Edition, pp. 6-9, Jun. 5, 2007.
DigiCube Co., Ltd. "Kingdom Hearts Ultimania". Revised Edition, pp. 17, 308, 312, Jun. 12, 2003.
Enterbrain Inc. 7th DRAGON 2020, Complete Guide. 1st Edition, pp. 28, Jan. 10, 2012.
Dec. 27, 2019 Corrected Notice of Allowability issued in U.S. Appl. No. 16/531,536.
Supercell, "Third Assertion Document by Obligors," submitted in Case No. H30(YO)22064 of JP Patent No. 6276314, pp. 1-24, Sep. 3, 2018.
Gmo, "Significantly Renewed 'Gacha and Ponta,'" submitted in Case No. H30(YO)22064 of JP Patent No. 6276314, pp. 1-2, Nov. 19, 2009.
Bangacha, "Summary of Spec Description of Gacha and Ponta 2," submitted in Case No. H30(YO) 22064 of JP Patent No. 6276314, pp. 1-11, Nov. 21, 2009.
Yamaguchi Masahiro, "What Is the New "Windows Touch" Function in Windows 7?" submitted in Case No. H30(YO)22064 of JP Patent No. 6276314, pp. 1-13, Oct. 23, 2009.
Nikkei Trendy Net, ""Windows 7 Sales Start!" Related Article to Be Further Acquainted With 7," submitted in Case No. H30(YO)22064 of JP Patent No. 6276314, pp. 1-4, Oct. 23, 2009.
HobbyJapan Co., Ltd., "Gandam Network Operation 3—First Step Guide," submitted in Case No. H30(YO)22064 of JP Patent No. 6276314, pp. 006, 007, 042, 043, Mar. 1, 2010.
Takizawa Osamu, "Bandai Namco, Win "Gandam Network Operation 3,"" submitted in Case No. H30(YO)22064 of JP Patent No. 6276314, pp. 1-6, Feb. 25, 2010.
Takizawa Osamu, "Bandai Namco, Win "Gandam Network Operation 3,"" submitted in Case No. H30(YO)22064 of JP Patent No. 6276314, pp. 1-2, printed on Aug. 9, 2018.
Supercell's Agent, "Function Confirmation Report," submitted in Case No. H30(YO)22064 of JP Patent No. 6276314, pp. 1-2, Sep. 3, 2018.
Gamecast, "Showing Really How Much Money Is Spent on Gandam Card Collections and Gacha: Taking a Look at Social Games", <http://gamecast-blog.com/archives/65683438.html>, Jun. 10, 2012.
Oct. 29, 2019 Office Action issued in Japanese Patent Application No. 2018-221107.
Nov. 1, 2019 Notice of Allowance issued in U.S. Appl. No. 16/531,536.

(56) References Cited

OTHER PUBLICATIONS

Supercell OY, Invalidity Expert Report of Stacy Friedman in Civil Action No. 2:19-cv-00237-JRG-RSP (Nov. 2, 2020).
Gree, Rebuttal Expert Report of Dr. Robert Akl, D.SC. Regarding Validity of U.S. Pat. Nos. 10,328,346 and 10,335,689 in Civil Action No. 2:19-cv-00237-JRG-RSP (Nov. 24, 2020).
Gree, "Patent Owner's Preliminary Response" in IPR2020-01553 (Dec. 30, 2020).
Gree, "Patent Owner's Preliminary Response" in IPR2020-01619 (Dec. 30, 2020).
Supercell OY, "Petition for Inter Partes Review" in IPR2020-01553 (Aug. 28, 2020).
U.S. Appl. No. 14/409,219, filed Dec. 18, 2014 in the name of Tsuyoshi Yoshikawa et al.
U.S. Appl. No. 16/053,149, filed Aug. 2, 2018 in the name of Tsuyoshi Yoshikawa et al.
U.S. Appl. No. 16/531,536, filed Aug. 5, 2019 in the name of Tsuyoshi Yoshikawa et al.
Ravin Balakrishnan, "Declaration" in Inter Partes Review IPR2020-01553 (Aug. 28, 2020).
Robert Corrina, "What is a Role Playing Game?" <www.gamasutra.com/blogs/RobertCorrina/20090311/83491/What_is_a_Role_Playing_Game.php> (Mar. 11, 2009).
Old-Games, "Secret of Monkey Island," <www.old-games.com/download/1569/secret-of-monkey-island-the> (Mar. 22, 2012).
Gus Mastrapa, "Scarce Borderlands Weapons Scratch That Old Diablo Itch" <www.wired.com/2009/10/borderlands/> (Oct. 20, 2009).
Borderlands Wiki, "Vending Machine" <https://borderlands.fandom.com/wiki/Vending_machine?oldid=222424> (Feb. 25, 2012).
M.J. Stephey, "A Brief History of Scrabble" <http://content.time.com/time/arts/article/0,8599,1867007,00.html> (Dec. 7, 2008).
World English-Language Scrabble Players' Association (WESPA), "Game Rules" Version 2.0, WESPA Rules Committee (Nov. 17, 2010).
Donald Sauter, "Scrabble—Dating Your Classic Scrabble Set" <www.donaldsauter.com/scrabble-dating.htm> (Mar. 4, 2011).
Infogrames, "Scrabble Complete PC Manual," Infogrames Interactive (2002—year sufficiently early that month is not at issue).
Francis Chang et al., "Modeling Player Session Times of Online Games" <www.researchgate.net/publication/2472459> (Jun. 2003).
John Carter, "The Original Magic Rulebook" <https://magic.wizards.com/en/articles/archives/original-magic-rulebook-2004-12-25> (Dec. 2004).
MTG Wiki, "Rarity" <https://mtg.gamepedia.com/index.php?title=Rarity&oldid=68569> (Jan. 2010).
Allen Rausch, "Magic: The Gathering Online 3.0 and the Theory of Virtual Objects" <http://pc.gamespy.com/pc/magic-the-gathering-online-20/620165p1.html> (Mar. 2005).
Kotaku, "Now Everyone Can Play the Pokémon Trading Card Game Online" <https://kotaku.com/now-everyone-can-play-the-pokemon-trading-card-game-onl-5834336> (Aug. 2011).
Wikibooks, "Scrabble/Rules" <https://en.wikibooks.org/wiki/Scrabble/Rules> (Dec. 2011).
Infogrames, "Scrabble Complete" <www.us.infogrames.com/games/scrabble_complete_pc_family> (Dec. 2002).
Amazon.com, "Scrabble Complete" <www.amazon.com/Scrabble-Complete-PC/dp/B00006910J> (Dec. 2011).
YouTube, "Hasbro Family Game Night: Scrabble Xbox Live Gameplay" <www.youtube.com/watch?v=yE_9UnATots> (Jun. 2011).
Gree, "Patent Owner's Preliminary Response" in PGR2020-00053 (Jul. 2020).
Supercell OY, "Petition for Inter Partes Review" in IPR2020-01619 (Sep. 14, 2020).
Ravin Balakrishnan, "Declaration" in Inter Partes Review IPR2020-01619 (Sep. 14, 2020).
Nintendo of America, "Final Fantasy VI Advance Instruction Booklet" Nintendo (2007—year sufficiently early that month is not at issue).
Daniel Primed, "Wasteland Ventures (Fallout) #5-3 Forms of Grind" <https://danielprimed.com/2011/01/wasteland-ventures-fallout-5-3-forms-of-grind/> (Jan. 2011).
"Microsoft Excel 2003 for Beginners," Information Technology Training Guide, California State University (May 2006).
Sarah Phillips, "A brief history of Facebook," The Guardian <www.theguardian.com/technology/2007/jul/25/media.newmedia> (Jul. 2007).
Michael Arrington, "Social Games: How the Big Three Make Millions," <https://techcrunch.com/2009/10/26/social-games-how-the-big-three-make-millions/> (Oct. 2009).
Juha-Matti Vanhatupa, "Browser Games for Online Communities," International Journal of Wireless & Mobile Networks vol. 2, No. 3 (Aug. 2010).
Angela Morales and Kyle Orland, "FarmVille for Dummies" Wiley Publishing, Inc. (2011—year sufficiently early that month is not at issue).
Gree, "Plaintiff's Opening Claim Construction Brief," in ED Texas 2:19-cv-00310-JRG-RSP (Jul. 24, 2020).
Gree, "Patent Owner's Preliminary Response" in PGR2020-00053 (Jul. 16, 2020).
Supercell OY, "Petitioner's Reply to Patent Owner's Preliminary Response" in IPR2020-01619 [Feb. 8, 2021].
Gree, "Patent Owner's Sur-Reply to Petitioner's Reply to Patent Owner's Preliminary Response" in IPR2020-01553 [Feb. 22, 2021].
PTAB, "Decision" in IPR2020-01553 Paper 13 [Mar. 18, 2021].
Supercell OY, "Petitioner's Reply to Patent Owner's Preliminary Response" in IPR2020-01553 [Feb. 8, 2021].
Gree, "Patent Owner's Sur-Reply to Petitioner's Reply to Patent Owner's Preliminary Response" in IPR2020-01619 [Feb. 22, 2021].
PTAB, "Decision Denying Institution" in IPR2020-01619, Paper 15 [Mar. 24, 2021].
Supercell, Invalidity Contentions and Disclosures, submitted in Civil Action No. 2:19-cv-00310-JRG (Apr. 7, 2020).
Supercell, Preliminary Ineligibility Contentions for U.S. Pat. No. 10,076,708, submitted in Civil Action No. 2:19-cv-00310-JRG (Apr. 7, 2020).
Supercell, Preliminary Ineligibility Contentions for U.S. Pat. No. 10,413,832, submitted in Civil Action No. 2:19-cv-00310-JRG (Apr. 7, 2020).
Supercell, Exhibit A-1—Mafia Wars Claim Chart, submitted in Civil Action No. 2:19-cv-00310-JRG (Apr. 7, 2020).
Supercell, Exhibit A-2—Famiville and Daily Rewards Claim Chart, submitted in Civil Action No. 2:19-cv-00310-JRG (Apr. 7, 2020).
Supercell, Exhibit A-3—Xu and Daily Rewards Claim Chart, submitted in Civil Action No. 2:19-cv-00310-JRG (Apr. 7, 2020).
Supercell, Exhibit A-4—Kamiyama and Xu Claim Chart, submitted in Civil Action No. 2:19-cv-00310-JRG (Apr. 7, 2020).
Supercell, Exhibit B-1—Braund and Xu Claim Chart, submitted in Civil Action No. 2:19-cv-00310-JRG (Apr. 7, 2020).
Supercell, Exhibit B-2—FarmVille and FarmVille for Dummies and Orland Claim Chart, submitted in Civil Action No. 2:19-cv-00310-JRG (Apr. 7, 2020).
Supercell, Exhibit B-3—Final Fantasy Xiv Claim Chart, submitted in Civil Action No. 2:19-cv-00310-JRG (Apr. 7, 2020).
Supercell, Exhibit B-4—Kamiyama and FarmVille for Dummies and Orland Claim Chart, submitted in Civil Action No. 2:19-cv-00310-JRG (Apr. 7, 2020).
Supercell, Exhibit B-5—Matsuzo and Xu Claim Chart, submitted in Civil Action No. 2:19-cv-00310-JRG (Apr. 7, 2020).
Supercell, Exhibit B-6—World of Warcraft Claim Chart, submitted in Civil Action No. 2:19-cv-00310-JRG (Apr. 7, 2020).
Supercell, Exhibit B-7—Xu and FarmVille for Dummies and Orland Claim Chart, submitted in Civil Action No. 2:19-cv-00310-JRG (Apr. 7, 2020).
Supercell, Exhibit B-8—Yamada and Xu and FarmVille for Dummies and Orland Claim Chart, submitted in Civil Action No. 2:19-cv-00310-JRG (Apr. 7, 2020).
Gree, Inc., "Motion To Strike Opinions Based On Undisclosed Invalidity Opinions And Untimely Source Code Production" in Case No. 2:19-cv-000310-JRG-RSP (Dec. 15, 2020).
Supercell Oy, "Motion for Summary Judgment of Invalidity for Failure to Claim Patent Eligible Subject Matter Under 35 U.S.C. § 101" in Civil Action No. 2:19-cv-00310-JRG-RSP (Dec. 16, 2020).

(56) References Cited

OTHER PUBLICATIONS

Supercell Oy, "Opposition to Motion to Strike Portions of the Expert Report of Stacy Friedman" in Civil Action No. 2:19-cv-00310-JRG-RSP (Dec. 30, 2020).

Gree, Inc., "Opposition to Motion for Summary Judgment of Invalidity for Failure to Claim Patent Eligible Subject Matter Under 35 U.S.C. § 101" in Case No. 2:19-cv-310-JRG-RSP (Dec. 30, 2020).

Gree, Inc., "Reply in Support of Its Motion to Strike Opinions Based on Undisclosed Invalidity Opinions and Untimely Source Code Production" in Case No. 2:19-cv-000310-JRG-RSP (Jan. 6, 2021).

Supercell Oy, "Reply in Support of Its Motion for Summary Judgment of Invalidity for Failure to Claim Patent Eligible Subject Matter Under 35 U.S.C. § 101" in Civil Action No. 2:19-cv-00310-JRG-RSP (Jan. 6, 2021).

Supercell Oy, "Sur-Reply in Support of Its Opposition to Motion to Strike Portions of the Expert Report of Stacy Friedman" in Civil Action No. 2:19-cv-00310-JRG-RSP (Jan. 13, 2021).

Gree, Inc., "Sur-Reply in Support of Its Opposition to Motion for Summary Judgment of Invalidity for Failure to Claim Patent Eligible Subject Matter Under 35 U.S.C. § 101" in Case No. 2:19-cv-00310-JRG-RSP (Jan. 13, 2021).

Supercell Oy, "Corrected Sur-Reply in Support of Its Opposition to Motion to Strike Portions of the Expert Report of Stacy Friedman" in Civil Action No. 2:19-cv-00310-JRG-RSP (Jan. 14, 2021).

Judge Roy Payne, "Memorandum Order" in Civil Action No. 2:19-CV-00310-JRG (Feb. 16, 2021).

Judge Roy Payne, "Report and Recommendation" in Case No. 2:19-cv-00200-JRG-RSP, Case No. 2:19-cv-00237-JRG-RSP, Case No. 2:19-cv-00310-JRG-RSP, Case No. 2:19-cv-00311-JRG-RSP (Apr. 16, 2021).

Supercell Oy, "Objection to Report and Recommendation" in Civil Action No. 2:19-cv-00237-JRG-RSP, 2:19-cv-00310-JRG-RSP, 2:19-cv-00311-JRG-RSP (Apr. 26, 2021).

Nov. 30, 2014 Office Action issued in Japanese Patent Application No. 2020-027055.

* cited by examiner

FIG. 2A

TID1

| Item identification information | Item name | Item type |
|---|---|---|
| UNI1 | Item A | 3 |
| UNI2 | Item B | 1 |
| UNI3 | Item C | 2 |
| UNI4 | Item D | 5 |
| UNI5 | Item E | 1 |
| UNI6 | Item F | 1 |
| UNI7 | Item G | 3 |
| UNI8 | Item H | 4 |
| UNI9 | Item I | 2 |
| UNI10 | Item J | 2 |
| UNI11 | Item K | 2 |
| UNI12 | Item K | 2 |
| UNI13 | Item K | 1 |
| UNI14 | Item L | 1 |
| UNI15 | Item M | 1 |
| UNI16 | Item M | 4 |
| UNI17 | Item N | 2 |
| UNI18 | Item O | 1 |
| UNI19 | Item P | 3 |
| UNI20 | Item Q | 3 |
| UNI21 | Item M | 5 |
| UNI22 | Item N | 2 |
| UNI23 | Item N | 1 |
| UNI24 | Item O | 1 |
| UNI25 | Item P | 6 |
| UNI26 | Item Q | 2 |
| UNI27 | Item R | 1 |
| UNI28 | Item S | 1 |
| UNI29 | Item T | |
| UNI30 | Item U | |

FIG. 2B

TID2

| Item identification information | Item name | Item type |
|---|---|---|
| UNI101 | Item A1 | 2 |
| UNI102 | Item B1 | 3 |
| UNI103 | Item C1 | 1 |
| UNI104 | Item D1 | 5 |
| UNI105 | Item E1 | 2 |
| UNI106 | Item F1 | 2 |
| UNI107 | Item G1 | 2 |
| UNI108 | Item H1 | 3 |
| UNI109 | Item I1 | 4 |
| UNI110 | Item J1 | 2 |
| UNI111 | Item K1 | 2 |
| UNI112 | Item K1 | 2 |
| UNI113 | Item K1 | 2 |
| UNI114 | Item L1 | 1 |
| UNI115 | Item M1 | 2 |
| UNI116 | Item M1 | 2 |
| UNI117 | Item N1 | 2 |
| UNI118 | Item O1 | 2 |
| UNI119 | Item P1 | 1 |
| UNI120 | Item Q1 | 5 |
| UNI121 | Item M1 | 5 |
| UNI122 | Item M1 | 3 |
| UNI123 | Item N1 | 5 |
| UNI124 | Item O1 | 5 |
| UNI125 | Item P1 | 1 |
| UNI126 | Item Q1 | 1 |
| UNI127 | Item R1 | 6 |
| UNI128 | Item S1 | 2 |
| UNI129 | Item T1 | 1 |
| UNI130 | Item U1 | 1 |

FIG. 2C

TID3

| Item identification information | Item name | Item type |
|---|---|---|
| UNI201 | Item A2 | 5 |
| UNI202 | Item B2 | 2 |
| UNI203 | Item C2 | 1 |
| UNI204 | Item D2 | 5 |
| UNI205 | Item E2 | 2 |
| UNI206 | Item F2 | 2 |
| UNI207 | Item G2 | 2 |
| UNI208 | Item H2 | 3 |
| UNI209 | Item I2 | 2 |
| UNI210 | Item J2 | 3 |
| UNI211 | Item K2 | 1 |
| UNI212 | Item K2 | 1 |
| UNI213 | Item K2 | 3 |
| UNI214 | Item L2 | 2 |
| UNI215 | Item M2 | 2 |
| UNI216 | Item M2 | 2 |
| UNI217 | Item N2 | 4 |
| UNI218 | Item O2 | 2 |
| UNI219 | Item P2 | 6 |
| UNI220 | Item Q2 | 2 |
| UNI221 | Item M2 | 3 |
| UNI222 | Item M2 | 3 |
| UNI223 | Item N2 | 4 |
| UNI224 | Item O2 | 2 |
| UNI225 | Item P2 | 1 |
| UNI226 | Item Q2 | 1 |
| UNI227 | Item R2 | 6 |
| UNI228 | Item S2 | 2 |
| UNI229 | Item T2 | 1 |
| UNI230 | Item U2 | 1 |

FIG. 3

| User identification information | Table identification information | Identification information | Identification information of provided items |
|---|---|---|---|
| UID1 | TID1 | UNI2 | UNI4 |
| UID2 | TID2 | UNI119 | UNI127 |
| UID3 | TID1 | UNI8 | UNI12 |
| UID4 | TID3 | UNI204 | UNI215 |
| UID5 | TID2 | UNI110 | UNI17 |
| ... | ... | ... | ... |

FIG. 4

| Item identification information | Item image |
|---|---|
| UNI1 | Item A image |
| UNI2 | Item B image |
| UNI3 | Item C image |
| UNI4 | Item D image |
| UNI5 | Item E image |
| ... | ... |

*FIG. 8*

| Acquirable item information ||| 
| Item type | Acquisition count | Total count |
| --- | --- | --- |
| 1 | 2 | 13 |
| 2 | 2 | 8 |
| 3 | 2 | 4 |
| 4 | 0 | 2 |
| 5 | 1 | 2 |
| 6 | 0 | 1 |

[Approach gauge]

201 202 203 204 205 206 207 208 209 210 211 212 213 214 215 216 217 218 219

| Item E | Item N | | | | | | | | | | | | | | | | | |

Note: Each ▨ contains an item with a high value for the item type.

FIG. 9

| Acquirable item information | | |
|---|---|---|
| Item type | Acquisition count | Total count |
| 1 | 2 | 13 |
| 2 | 1 | 8 |
| 3 | 1 | 4 |
| 4 | 0 | 2 |
| 5 | 1 | 2 |
| 6 | 0 | 1 |

| Scratch card | | | | |
|---|---|---|---|---|
| 301 | 302 | 303 | 304 | 305 |
| 306 | 307 | 308 | 309 | 310 |
| 311 | 312 | 313 | 314 | 315 |
| 316 | 317 | 318 | 319 | 320 |
| 321 | 322 | 323 | 324 | 325 |

GAME CONTROL METHOD, GAME SERVER, AND PROGRAM

CROSS-REFERENCE TO RELATED APPLICATION

This application is a continuation of U.S. Ser. No. 16/531,536 filed Aug. 5, 2019, which is a continuation of U.S. Ser. No. 16/053,149 filed Aug. 2, 2018, which is a continuation of U.S. Ser. No. 14/409,219 filed Dec. 18, 2014, which is a National Stage of PCT/JP2013/003899 filed Jun. 21, 2013 and is based on and claims priority to and the benefit of Japanese Patent Application No. 2012-140213 filed Jun. 21, 2012, the entire contents of the above applications being incorporated herein by reference.

TECHNICAL FIELD

The present invention relates to a game control method, a game server, and a program.

BACKGROUND ART

Conventionally, in a battle game server, each user's deck is formed by a plurality of battle cards or the like stored for each user, and the battle game server allows a plurality of users to compete with each other based on the total value of the attack strength and defense strength of the deck (for example, see Patent Literature 1). In such a battle game server, the user acquires a battle card by methods such as purchasing the battle card or obtaining the battle card by winning a battle against an opponent.

CITATION LIST

Patent Literature

Patent Literature 1: JP 2008-220984 A

SUMMARY OF INVENTION

Technical Problem

In a conventional battle game server, however, the methods for acquiring battle cards and the like are limited, causing the user to lose interest in the game. In particular, since it is difficult to acquire a battle card or the like with a high rarity value, the user ends up with the impression that such an item cannot be acquired at all and suffers a drastic loss of interest in the game.

Accordingly, the present invention has been conceived in light of the above problems and provides a game control method, a game server, and a program that can increase the variations on methods for acquiring battle cards and the like, increase the predictability of acquisition of a card or the like with a high rarity value or the like, and heighten interest in the game.

Solution to Problem

A game control method according to the present invention for solving the above problems includes the steps of: (a) presenting a communication terminal, connected over a communication line, with acquirable item information that, for each item type, includes a total count and an acquisition count or a non-acquisition count of items when receiving, from the communication terminal, a request to present information related to items acquirable by the communication terminal; (b) determining an item to provide to the communication terminal when receiving an item acquisition request from the communication terminal; and (c) changing the acquirable item information when receiving a reset request from the communication terminal.

In the game control method according to the present invention, in step (a), a method for presenting the acquirable item information presented to the communication terminal may differ between a first item and a second item, a numerical value of the item type being at least a predetermined value for the first item, and the numerical value of the item type being less than the predetermined value for the second item.

In the game control method according to the present invention, the acquirable item information for the first item may include identification information or an image for an item.

In the game control method according to the present invention, information on another user who has acquired the first item may be presented.

In the game control method according to the present invention, in step (b), based on a selection request from the communication terminal, one item selected from among items for which the count of necessary attempts for acquisition is at most the predetermined value may be determined to be the item to provide.

A game server according to the present invention includes: information presentation means for presenting a communication terminal, connected over a communication line, with acquirable item information that, for each item type, includes a total count and an acquisition count or a non-acquisition count of items when a request to present information related to items acquirable by the communication terminal is received from the communication terminal; and control means for determining an item to provide to the communication terminal when an item acquisition request is received from the communication terminal, such that the control means changes the acquirable item information when receiving a reset request from the communication terminal.

In the game server according to the present invention, the information presentation means may adopt a different method for presenting the acquirable item information presented to the communication terminal for a first item than for a second item, a numerical value of the item type being at least a predetermined value for the first item, and the numerical value of the item type being less than the predetermined value for the second item In the game server according to the present invention, the acquirable item information for the first item may include identification information or an image for an item.

In the game server according to the present invention, the information presentation means may present information on another user who has acquired the first item.

In the game server according to the present invention, based on a selection request from the communication terminal, the control means may determine one item selected from among items for which the count of necessary attempts for acquisition is at most the predetermined value to be the item to provide.

A program according to the present invention is for causing a computer that functions as a battle game server to perform the steps of: (a) presenting a communication terminal, connected over a communication line, with acquirable item information that, for each item type, includes a total count and an acquisition count or a non-acquisition count of items when receiving, from the communication terminal, a request to present information related to items acquirable by the communication terminal; (b) determining an item to provide to the communication terminal when receiving an item acquisition request from the communication terminal; and (c) changing the acquirable item information when receiving a reset request from the communication terminal.

In the program according to the present invention, in step (a), a method for presenting the acquirable item information presented to the communication terminal may differ between a first item and a second item, a numerical value of the item type being at least a predetermined value for the first item, and the numerical value of the item type being less than the predetermined value for the second item.

In the program according to the present invention, the acquirable item information for the first item may include identification information or an image for an item.

In the program according to the present invention, in step (a), information on another user who has acquired the first item may be presented.

In the program according to the present invention, in step (b), s based on a selection request from the communication terminal, one item selected from among items for which the count of necessary attempts for acquisition is at most the predetermined value may be determined to be the item to provide.

Advantageous Effect of Invention

According to the game control method, game server, and program of the present invention, it is possible to increase the variations on methods for acquiring battle cards and the like, increase the predictability of acquisition of a card or the like with a high numerical value for the item type, and heighten interest in the game.

BRIEF DESCRIPTION OF DRAWINGS

The present invention will be further described below with reference to the accompanying drawings, wherein:

FIGS. 2(a), 2(b), and 2(c) are examples of an item information table in Embodiment 1;

FIG. 3 is an example of a user information table in Embodiment 1;

FIG. 4 is an example of item data in Embodiment 1;

FIG. 8 is an example of acquirable item information in Embodiment 3;

FIG. 9 is an example of a scratch card for selection in Embodiment 3; and

DESCRIPTION OF EMBODIMENTS

The following describes embodiments of the present invention.

Embodiment 1

Figure 1:
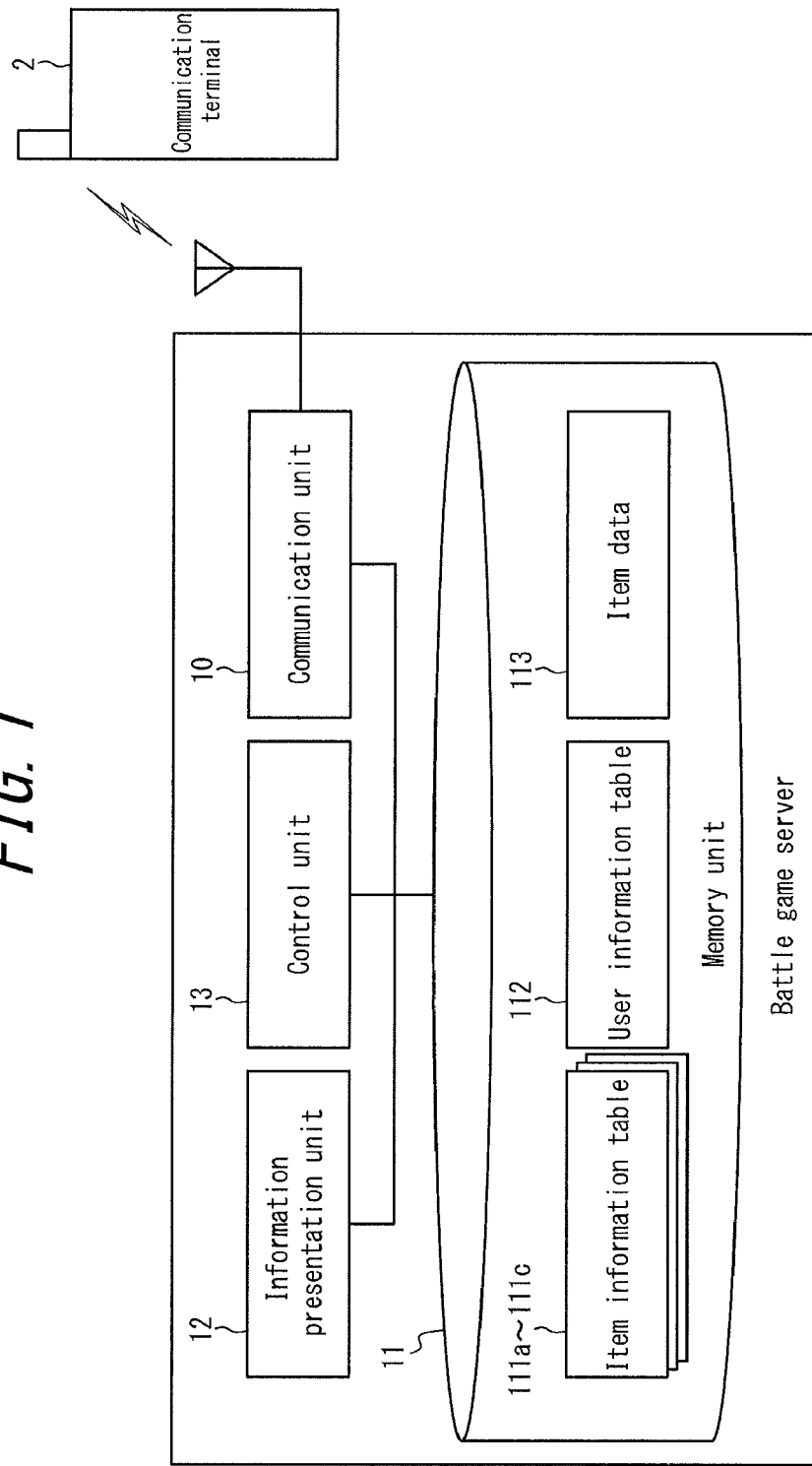
FIG. 1 is a block diagram of a battle game server in Embodiment 1.

FIG. 1 is a block diagram of a battle game server 1 in Embodiment 1 of the present invention. The battle game server 1 according to Embodiment 1 of the present invention includes a communication unit 10, a memory unit 11, an information presentation unit 12, and a control unit 13.

The communication unit 10 communicates with a communication terminal 2 over either or both of a wireless and wired connection.

In association with identification information uniquely allocated to each user that operates a communication terminal 2 (referred to below as user identification information), the memory unit 11 stores information on items to provide, a total count of items, item type, and an acquisition count. An "item" refers to any of a variety of objects used within a game, such as a battle card constituting a user's deck, a character, a weapon, armor, an ornament, a plant, food, and the like. The item type is a numerical value representing the rarity value of the item, a numerical value representing the category of the item, or the like.

Specifically, the memory unit 11 stores this information by dividing the information among tables. A plurality of item information tables 111a to 111c, a user information table 112, and item data 113 are stored in the memory unit 11. While three item information tables are described here, this example is not limiting, and the number of item information tables may be two or fewer, or four or more.

The item information tables 111a to 111c are tables including information on the total count of items and the item type. FIGS. 2(a) to 2(c) illustrate examples of the item information tables 111a to 111c. As illustrated in FIGS. 2(a) to 2(c), for example the item information table 111a includes item identification information "UNI1", an item name "item A", and an item type "3". The item identification information is an identifier for uniquely identifying an item in the present system. The item information tables 111a to 111c are provided with table identification information for uniquely identifying au item information table in the battle game server 1. Here, the item information tables 111a to 111c are respectively provided with "TID1", "TID2", and "TID3" as the table identification information.

The user information table 112 is a table storing, for each user, the provided items and information for calculating an item acquisition count. The user information table 112 associates the user identification information, table identification information, and identification information of provided items.

FIG. 3 illustrates an example of the user information table 112. As illustrated in FIG. 3, the user information table 112 includes user identification information "UID1", table identification information "TID1", identification information of provided items "UNI2" and "UNI4", and the like.

The item data 113 stores data on an image for an item provided to the user in association with item identification information. FIG. 4 illustrates an example of the item data 113. As illustrated in FIG. 4, the item data for example includes item identification information "UNI1", an item image "item A image", and the like. The image data may be in any image format, such as JPEG, GIF, PNG, or the like.

When receiving a request to present information from the communication terminal 2, then based on information, stored in the memory unit 11, that corresponds to the user identification information pertaining to the communication terminal 2, the information presentation unit 12 presents the communication terminal 2, via the communication unit 10, with acquirable item information that includes information, for each item type, on a total count and an acquisition count of items.

Specifically, when a request to present information is received from the communication terminal 2 via the communication unit 10, then based on the item information tables 111a to 111c, the information presentation unit 12 tallies the total count of items for each item type. The information presentation unit 12 also refers to the user information table 112 to calculate the acquisition count of items for each item typo based on the identification information of provided items and the table identification information that correspond to the user identification information pertaining to the communication terminal 2. The information presentation unit 12 then presents the communication terminal 2, via the communication unit 10, with the result of calculation as the acquirable item information.

Figure 5:
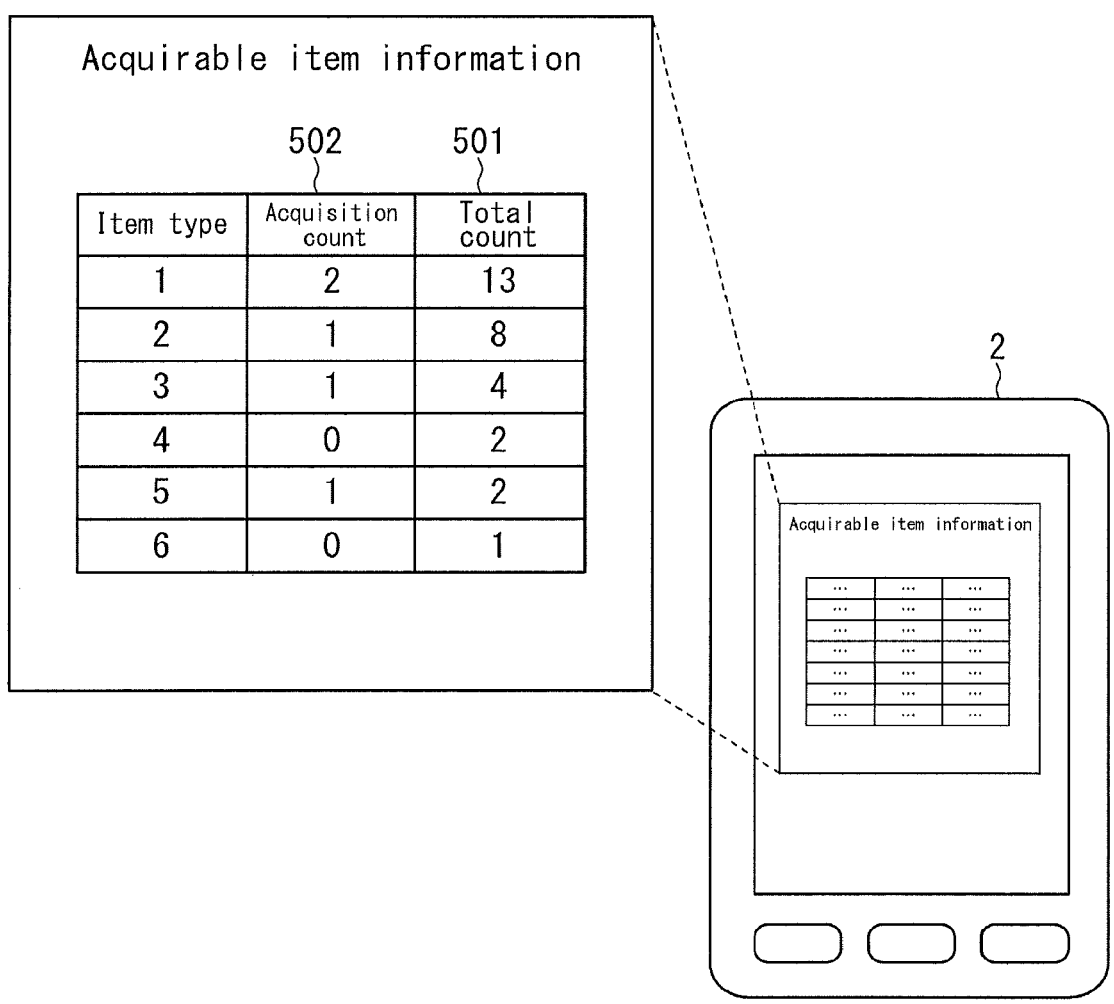
FIG. 5 is an example of acquirable item information in Embodiment 1.

FIG. 5 is an example of the acquirable item information that the information presentation unit 12 presents. FIG. 5 illustrates an example of the acquirable item information presented when a request to present information is received from the communication terminal 2 and the user identification information pertaining to the communication terminal 2 is "UID1". As illustrated in FIG. 5, information 501 on the total count and information 502 on the acquisition count of items for each item type are presented to the communication terminal 2, The case of presenting the acquisition count has been described above, yet this example is not limiting. For example, a non-acquisition count may be presented by subtracting the acquisition count from the total count of items.

The control unit 13 performs a variety of control pertaining to the battle game server 1. For example, when receiving an item acquisition request from the communication terminal 2, the control unit 13 determines one item to provide to the communication terminal 2 based on information corresponding to the user identification information pertaining to the communication terminal 2.

Specifically, when receiving an item acquisition request from the communication terminal 2 via the communication unit 10, the control unit 13 refers to the user information table 112, and based on the table identification information that corresponds to the user identification information pertaining to the communication terminal 2, retrieves the item information table, Next, the control unit 13 refers to the user information table 112 and retrieves the identification information of provided items that corresponds to the user identification information pertaining to the communication terminal 2. Subsequently, the control unit 13 refers to one of the item information tables 111a to 111c, randomly selects an item not included in the identification information of provided items, and determines that the selected item is the item to provide to the communication terminal 2.

The control unit 13 then provides the item to the communication terminal 2 via the communication unit 10. Specifically, the control unit 13 refers to the item data 113 and provides the communication terminal 2, via the communication unit 10, with the item image corresponding to the item identification information pertaining to the item to be provided. The control unit 13 also adds the item identification information pertaining to the provided item to the user information table 112 as identification information of provided items.

For example, when an item acquisition request is received from the communication terminal 2, and the user identification information pertaining to the communication terminal 2 is "UID1", then the control unit 13 refers to the user information table 112, and based on the table identification information "TID1" corresponding to UID1, retrieves the item information table 111a. Next, the control unit 13 refers to the user information table 112 and retrieves the identification information of provided items that corresponds to "UID1". Subsequently, the control unit refers to the item information table 111a, randomly selects item identification information not included in the identification information of provided items (for example, "UNI1"), and determines that the selected item is the item to provide to the communication terminal 2. The control unit 13 then refers to the item data 113 and provides the communication terminal 2, via the communication unit 10, with the item image "item A image" corresponding to the item identification information "UNI1" pertaining to the item to be provided. The control unit 13 also adds the item identification information "UNI1" pertaining to the provided item to the user information table 112 as identification information of provided items.

Furthermore, in the present invention, the battle game server 1 is configured to allow for receipt of a reset request at any time from the communication terminal 2. In general terms, the reset request is a request for resetting the current user information table 112. When receiving a reset request from the communication terminal 2 pertaining to predetermined user identification information, the control unit 13 changes and stores, in the memory unit 11, the table identification information and identification information of provided items that correspond to the user identification information pertaining to the communication terminal 2.

Specifically, when receiving a reset request from the communication terminal 2 via the communication unit 10, the control unit 13 changes the table identification information that corresponds to the user identification information pertaining to the communication terminal 2 and that was stored in the user information table 112 of the memory unit 11 to other table identification information.

For example, when a reset request is received from the communication terminal 2, and the user identification information pertaining to the communication terminal 2 is "UID1", the control unit 13 changes the table identification information that corresponds to "UID1" of the user information table 112 randomly from "TID1" to "TID2" or "TID3".

Figure 6:
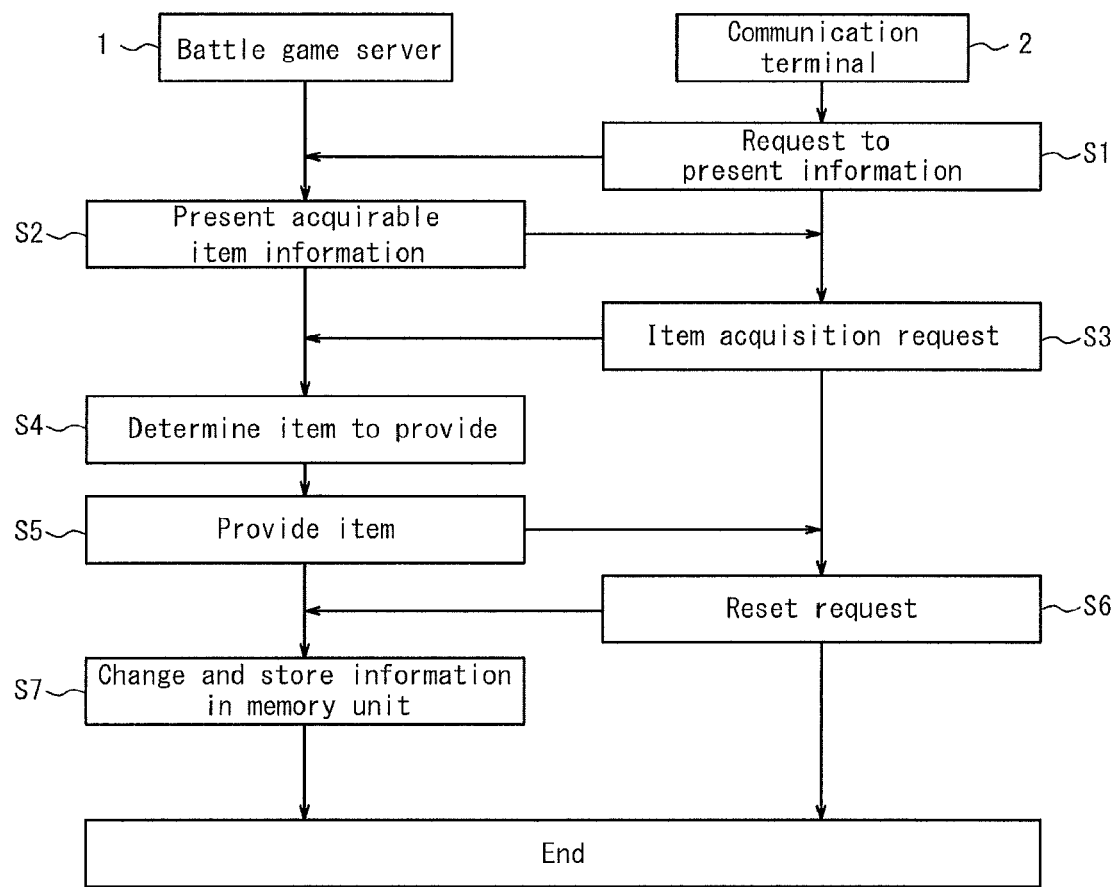
FIG. 6 is a flowchart of operations by the battle game server in Embodiment 1.

Next, operations by the battle game server 1 in Embodiment 1 of the present invention are described using the flowchart in FIG. 6. It is assumed that the tables illustrated in FIGS. 2(a), 2(b), and 2(c) through FIG. 4 have been stored in advance in the memory unit 11 at the time of operation by the battle game server 1.

First, when a request to present information is received from the communication terminal 2 (step S1), then based on information, stored in the memory unit 11, that corresponds to the user identification information pertaining to the communication terminal 2, the information presentation unit 12 presents the communication terminal 2, via the communication unit 10, with acquirable item information that includes information, for each item typo, on the total count and the acquisition count of items (step S2).

Specifically, when a request to present information is received from the communication terminal 2 via the communication unit 10, then based on the item information tables 111a to 111c, the information presentation unit 12 tallies the total count of items for each item type. The information presentation unit 12 also refers to the user information table 112 to calculate the acquisition count of items for each item type based on the identification information of provided items and the table identification information that correspond to the user identification information pertaining to the communication terminal 2. The information presentation unit 12 then presents the communication terminal 2, via the communication unit 10, with the result of calculation as the acquirable item information.

Subsequently, when receiving an item acquisition request from the communication terminal 2 (step S3), the control unit 13 determines one item to provide to the communication terminal 2 based on information corresponding to the user identification information pertaining to the communication terminal 2 (step S4).

Specifically, when receiving an item acquisition request from the communication terminal 2 via the communication unit 10, the control unit 13 refers to the user information table 112, and based on the table identification information that corresponds to the user identification information pertaining to the communication terminal 2, retrieves the item information table. Next, the control unit 13 refers to the user information table 112 and retrieves the identification information of provided items that corresponds to the user identification information pertaining to the communication terminal 2. Subsequently, the control unit 13 refers to one of the item information tables 111a to 111c, randomly selects an item not included in the identification information of provided items, and determines that the selected item is the item to provide to the communication terminal 2.

Subsequently, the control unit 13 provides the item to the communication terminal 2 via the communication unit 10 (step S5). Specifically, the control unit 13 refers to the item data 113 and provides the communication terminal 2, via the communication unit 10, with the Item image corresponding to the item identification information pertaining to the item to be provided. The control unit 13 also adds the item identification information pertaining to the provided item to the user information table 112 as identification information of provided items.

Subsequently, when receiving a reset request from the communication terminal 2 pertaining to predetermined user identification information (step S6), the control unit 13 changes and stores, in the memory unit 11, the table identification information and identification information of provided items that correspond to the user identification information pertaining to the communication terminal 2 (step S7).

Specifically, when receiving a reset request from the communication terminal 2 via the communication unit 10, the control unit 13 changes the table identification information that corresponds to the user identification information pertaining to the communication terminal 2 and that was stored in the user information table 112 of the memory unit 11 to other table identification information.

In this way, according to the battle game server 1 of Embodiment 1, based on information in the memory unit 11, the information presentation unit 12 presents the communication terminal 2 with acquirable item information that includes information, for each item type of items, on a total count and an acquisition count of items, thereby increasing the predictability of acquisition of an item with a predetermined item type (for example, an item with a high rarity value or the like). Furthermore, the battle game server 1 receives a reset request et any time from the communication terminal 2 and changes information pertaining to items that are provided, the total count of items, and the item type and acquisition count for each item, thereby increasing the variations on methods for acquiring items, increasing the predictability of acquisition of an item for which the numerical value of the item type is at least a predetermined value, and heightening interest in the game.

After step S7, the information presentation unit 12 may present the communication terminal 2 with post-reset acquirable item information based on the item information tables 111a to 111c and the table identification information of the user information table 112 in the memory unit 11. By doing so, the user can more easily grasp the number of items for each item type after the reset, thereby further increasing the predictability of acquisition of an item for which the numerical value of the item type is at least a predetermined value and heightening interest in the game.

The remaining number of all items may be included in the acquirable item information that the information presentation unit 12 presents. Specifically, the information presentation unit 12 may calculate the remaining number of items by subtracting the item acquisition count from the total number of items stored in the item information tables 111a to 111c and include the result of calculation in the acquirable item information.

In step S5, the control unit 13 may adopt a different method for presenting the acquirable item information to the communication terminal 2 far an item (first item) for which the numerical value of the item type is et least a predetermined value and an item (second item) for which the numerical value of the item type is less than the predetermined value. For example, the information presentation unit 12 may display an image for the first item yet display only the item name or the like, without displaying an image, for the second item. In other words, the acquirable item information that the information presentation unit 12 presents for the first item may include identification information (item name or the like) or an image for the item.

The information presentation unit 12 may present information related to another user who has acquired the first item.

Embodiment 2

The following describes Embodiment 2 of the present invention. Since the structure of the battle game server 1 according to Embodiment 2 is the same as the structure of the battle game server 1 according to Embodiment 1, the same reference numerals are used in the following description. In general terms, Embodiment 2 differs from Embodiment 1 in that the acquirable item information presented by the information presentation unit 12 includes a count of necessary attempts for acquisition for each item for which the numerical value of the item type is at least a predetermined value. The count of necessary attempts for acquisition is retrieved based on information corresponding to the user identification information pertaining to the communication terminal 2.

Specifically, the information presentation unit 12 refers to the user information table 112, and based on the table identification information that corresponds to the user identification information pertaining to the communication terminal 2, retrieves the item information table pertaining to the user identification information. Next, the information presentation unit 12 refers to the user information table 112 and retrieves the identification information of provided items pertaining to the communication terminal 2. Subsequently, the information presentation unit 12 randomly extracts, from the item information table, 19 pieces of item identification information not included in the identification information of provided items. The information presentation unit 12 stores the 19 extracted pieces of item identification information and stores provision sequence numbers (1 to 19) in the memory unit 11. When receiving an item acquisition request, the control unit 13 determines the item to provide based on the provision sequence numbers stored in the memory unit. In other words, the numbers 1 to 19 each represent the count of acquisition attempts that are necessary in order to acquire the item corresponding to the item identification information (referred to below as the count of necessary attempts for acquisition).

Subsequently, the information presentation unit 12 retrieves the item and item type pertaining to each piece of item identification information from one of the item information tables 111*a* to 111*c*. Next, for the retrieved items, the information presentation unit 12 retrieves the count of necessary attempts for acquisition for each item for which the numerical value of the item type is at least a predetermined value. The information presentation unit 12 then presents the communication terminal 2 with acquirable item information that includes the retrieved count of necessary attempts for acquisition for each item for which the numerical value of the item type is at least a predetermined value.

Figure 7A:
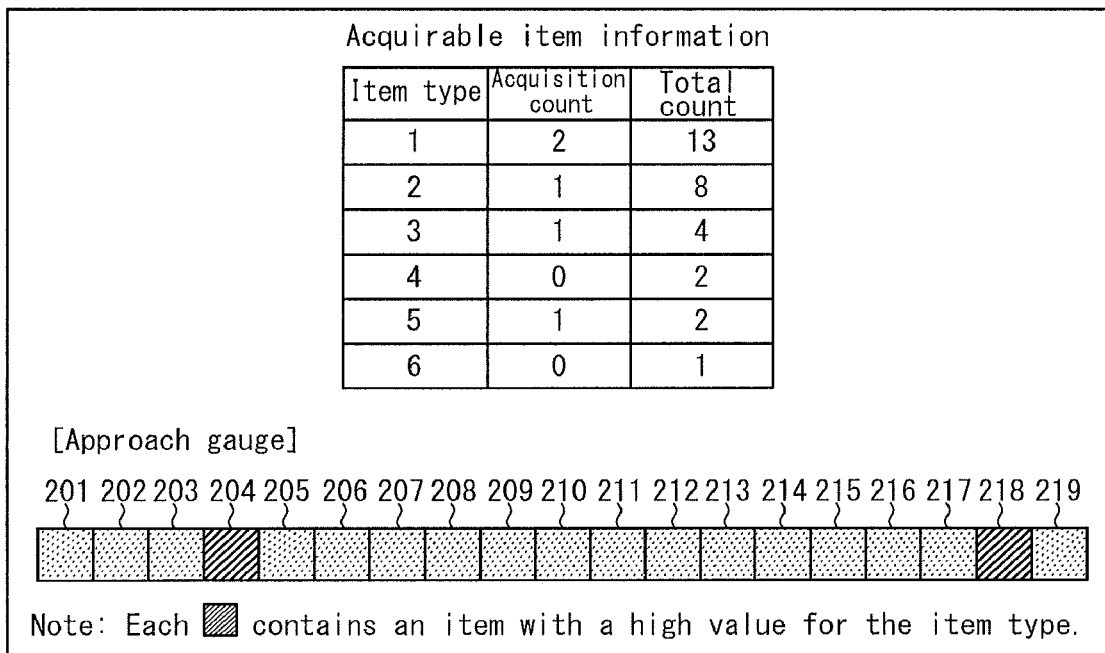
FIGS. 7(a) and 7(b) are examples of acquirable item information in Embodiment 2.
Figure 7B:
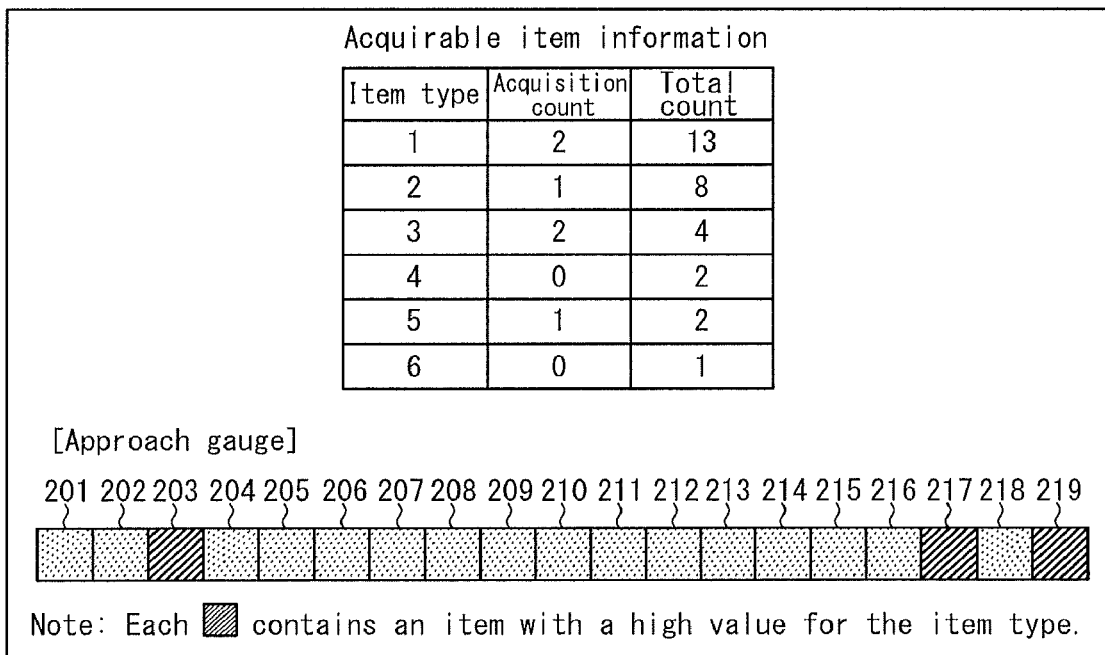

FIG. 7(*a*) illustrates an example of acquirable item information presented by the information presentation unit 12 in Embodiment 2. FIG. 7(*a*) illustrates an example of displaying the provision sequence of items provided to the communication terminal 2 as a gauge when a request to present information is received from the communication terminal 2, The gauge is composed of a plurality of boxes. Items are associated with the boxes 201 to 219 so that the respective counts of necessary acquisition attempts are 1 to 19. Each box is displayed with a pattern that differs in accordance with the item type of the corresponding item.

As illustrated in the example in FIG. 7(*a*), when the numerical value of the item type is at least a predetermined value, the pattern shown in box 204 and the like is displayed. Here, the case of the predetermined value being four is illustrated. Conversely, when the numerical value of the item type is less than the predetermined value, the pattern shown in box 201 and the like is displayed. In other words, FIG. 7(*a*) displays the count of necessary attempts for acquisition for each item for which the numerical value of the item type is at least a predetermined value. FIG. 8(*a*) also displays each count of necessary attempts for acquisition when the numerical value of the item type is less than a predetermined value.

When an item acquisition request is received from the communication terminal 2, an item is provided, and the count of acquisition attempts increases by one, then the count of necessary attempts for acquisition decreases by one for all items. In this case, as illustrated in FIG. 8(*b*), the items corresponding to boxes 201 to 219 each shift (move) one box to the left. Accordingly, with this gauge, the user can intuitively grasp the predictability of acquisition of items for which the numerical value of the item type is at least a predetermined value.

In this way, according to the battle game server 1 of Embodiment 2, the information presentation unit 12 presents the communication terminal 2 with the count of necessary attempts for acquisition for each item for which the numerical value of the item type is at least a predetermined value, thereby increasing the variations on methods for acquiring items, increasing the predictability of acquisition of an item for which the item type is at least a predetermined value, and heightening interest in the game. Furthermore, displaying the count of necessary attempts for acquisition when the numerical value of the item type is at least a predetermined value further increases the user's sense of anticipation, enticing the user to continue to play the game longer.

The patterns for displaying the boxes 201 to 219 are not limited to these examples. The boxes 201 to 219 may be painted a predetermined color in accordance with the item type, or a predetermined icon, character, or the like may be displayed in the boxes 201 to 219.

A certain percentage of the boxes for which the numerical value of the item type is less than a predetermined value may be displayed with the same pattern as boxes corresponding to items for which the numerical value of the item type is at least a predetermined value. In this way, items for which the numerical value of the item type is less than a predetermined value are mixed in among the boxes displayed with the pattern corresponding to items for which the numerical value of the item type is at least a predetermined value, thereby making the game more interesting and enticing the user to continue to play the game longer.

When the count of necessary attempts for acquisition is at most a predetermined value, detailed information on the item to be provided (referred to below as item detail information) may be presented. The item detail information is preferably the item name and item type. The predetermined value is, for example, two. FIG. 8 is an example of presenting item detail information. The counts of necessary acquisition attempts for boxes 201 and 202 are respectively one and two. Accordingly, the item name is displayed as the item detail information in boxes 201 and 202, With this configuration, the user can grasp the item detail information for items that can be acquired in a range in which the count of necessary attempts for acquisition is at most a predetermined value. Therefore, the user is provided with incentive to increase the occasions of an item acquisition request and is enticed to continue to play the game longer.

In the example in FIGS. 7(*a*) and 7(*b*), the boxes are displayed with two types of patterns, using the numerical value of the item type as a standard, yet this example is not limiting. A plurality of standard predetermined values may be established to display the boxes with three or more types of patterns. The patterns that are displayed may also be increased as the count of necessary attempts for acquisition is smaller. With this approach, as the count of necessary attempts for acquisition is smaller, the item type of the item to be acquired can be grasped in greater detail. Therefore, the user is provided with incentive to increase the occasions of an item acquisition request and is enticed to continue to play the game longer.

Note that while the gauges in FIGS. 7(*a*), 7(*b*), and 8 are composed of 19 boxes, the number of boxes is not limited to 19. The number may be 18 or less, or 20 or more. Furthermore, the approach gauge Illustrated in FIG. 8 has an I shape, yet this example is not limiting. Many variations are possible, such as a winding S shape, or a Y shape with a forking tip. In the forking variation, predetermined dummy boxes assigned randomly by the battle game server 1 may be displayed in one of the two forks.

In FIGS. 7(*a*), 7(*b*), and 8, examples are illustrated in which information, for each item type, on the total count and the acquisition count of items is also displayed, yet these examples are not limiting. Display may be limited to the gauge, without displaying the information, for each item type, on the total count and the acquisition count of items. In other words, in FIGS. 7(*a*), 7(*b*), and 8, examples are illustrated in which the acquirable item information includes information, for each item type, on the total count and the acquisition count of items and includes the count of necessary attempts for acquisition for each item for which the numerical value of the item type is at least a predetermined value, yet these examples are not limiting. The acquirable item information may be configured to include only the count of necessary attempts for acquisition for each item for which the numerical value of the item type is at least a predetermined value.

Embodiment 3

The following describes Embodiment 3 of the present invention. Since the structure of the battle game server 1 according to Embodiment 3 is the same as the structure of the battle game server 1 according to Embodiment 1, the same reference numerals are used in the following description. In general terms, Embodiment 3 differs from Embodiment 1 in that the acquirable item information presented by the information presentation unit 12 includes the total count of items, for each item type, among items for which the count of necessary attempts for acquisition is at most a predetermined value.

The acquirable item information presented by the information presentation unit 12 in Embodiment 3 includes the total count of items for which the numerical value of the item type is at least a predetermined value among items for which the count of necessary attempts for acquisition is at most a predetermined value, as retrieved based on the information corresponding to the user identification information pertaining to the communication terminal 2.

Specifically, the information presentation unit 12 refers to the user information table 112, and based on the user identification information that corresponds to the user identification information pertaining to the communication terminal 2, retrieves the item information table pertaining to the user identification information. Next, the information presentation unit 12 refers to the user information table 112 and retrieves the identification information of provided items pertaining to the communication terminal 2. Subsequently, the information presentation unit 12 randomly extracts, from the item information table, 25 pieces of item identification information not included in the identification information of provided items. The information presentation unit 12 stores the 25 extracted pieces of item identification information and stores provision sequence numbers (1 to 25) in the memory unit 11. When receiving an item acquisition request, the control unit 13 determines the item to provide based on the provision sequence numbers stored in the memory unit. In other words, the numbers 1 to 25 each represent the count of necessary attempts for acquisition corresponding to the item identification information.

Subsequently, the information presentation unit 12 retrieves the item and item type pertaining to each piece of item identification information from one of the item information tables 111a to 111c. The information presentation unit 12 then tallies the total count of items for which the numerical value of the retrieved item type is at least a predetermined number and presents the communication terminal 2 with acquirable item information that includes the tallied total count of items for each item type.

FIG. 9 illustrates an example of acquirable item information presented by the information presentation unit 12 in Embodiment 3. In FIG. 9, items for which the count of necessary attempts for acquisition is 25 or less are displayed with a sheet (scratch card) composed of 25 cells 301 to 325. Each cell corresponds to an item for which the count of necessary attempts for acquisition is 25 or less. The items for which the count of necessary attempts for acquisition is 25 or less are randomly associated with the cells 301 to 325.

As illustrated in the example in FIG. 9, when the numerical value of the item type is at least a predetermined value, the pattern shown in cell 301 and the like is displayed. Here, the predetermined value is four. Conversely, when the item type is less than the predetermined value, the pattern shown in cell 302 and the like is displayed. In other words, FIG. 9 displays the total count of items for which the numerical value of the item type is at least a predetermined value among items for which the count of necessary attempts for acquisition is 25 or less.

In this way, according to the battle game server 1 of Embodiment 3, the information presentation unit 12 presents the communication terminal 2 with the total count of items for which the numerical value of the item type is at least a predetermined value among items for which the count of necessary attempts for acquisition is at most a predetermined value, thereby increasing the variations on methods for acquiring items, further increasing the predictability of acquisition of an item for which the numerical value of the item type is at least a predetermined value, and heightening interest in the game.

The patterns for displaying the cells 301 to 325 are not limited to these examples. The cells 301 to 325 may be painted a predetermined color in accordance with the item type, or a predetermined icon, character, or the like may be displayed in the cells 301 to 325.

Furthermore, based on a selection request from the communication terminal 2, the control unit 13 may select one item, from among items for which the count of necessary attempts for acquisition is at most a predetermined value, as the item to provide. In this case, the information presentation unit 12 may present the communication terminal 2 with a scratch card for selection in which all cells are displayed with the same pattern to prompt the communication terminal 2 to select one of the cells.

FIG. 10(*a*) illustrates an example of a screen for selecting an item to acquire. The screen displays the scratch card for selection. Each cell in the scratch card in FIG. 10(*a*) corresponds to an item for which the count of necessary attempts for acquisition is 25 or less. As illustrated in FIG. 10(*a*), the cells of the scratch card are displayed with the same pattern, and the user cannot tell what items corresponds to which cells.

The user can select any location on the scratch card using an operation unit (not illustrated) such as a key or a touch panel of the communication terminal 2, and the communication terminal 2 transmits a selection request to the battle game server 1 based on the user operation. The control unit 13 of the battle game server 1 then determines that the item corresponding to the cell pertaining to the selection request is the item to provide to the communication terminal 2.

FIG. 10(*b*) illustrates an example of cells 308, 316, and 320 being selected. The selected cells are displayed with the same pattern as the cells in the scratch card shown in FIG. 9. Note that the item detail information corresponding to the selected cells may be displayed in the selected cells.

In this way, the variations on methods for acquiring items can be further increased, the predictability of acquisition of an item with a high item type can be further increased, and interest in the game can be heightened.

The scratch cards in FIGS. 9, 10(*a*), and 10(*b*) are composed of 25 cells in a sheet with 5 rows and 5 columns, yet this example is not limiting. The scratch card may be composed of M×N cells in a sheet with M rows and N columns (M and N being integers greater than or equal to 2). Furthermore, the scratch cards in FIGS. 10(*a*) and 10(*b*) are not limited to a square shape. For example, the scratch cards may be a polygon, or instead of being two-dimensional, the scratch cards may be in a three-dimensional rectangular shape of a die.

Figure 10A:
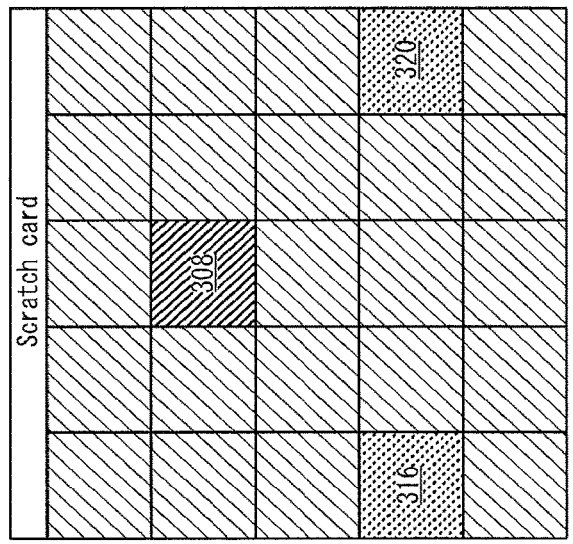
FIGS. 10(a) and 10(b) are examples of a screen for selecting an item to acquire.
Figure 10B:
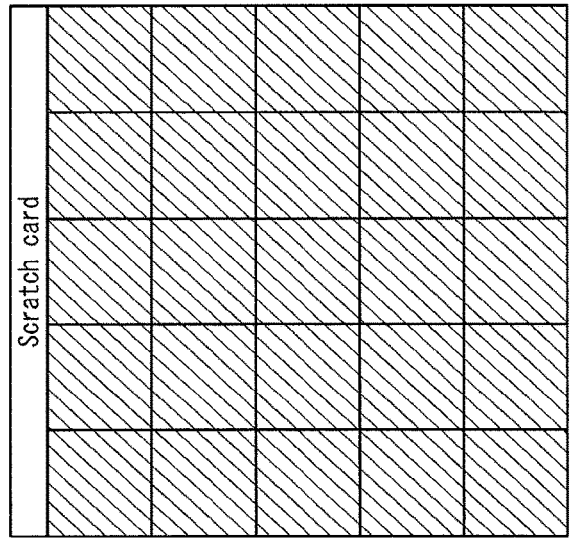

In FIGS. 9, 10(*a*), and 10(*b*), examples are illustrated in which information, for each item type, on the total count and the acquisition count of items is also displayed, yet these examples are not limiting. Display may be limited to the scratch card, without displaying the information, for each item type, on the total count and the acquisition count of items. In other words, in FIGS. 10(a), 10(b), and 11, examples are illustrated in which the acquirable item information includes information, for each item type, on the total count and the acquisition count of items and includes the total count of items, for each item type, among items for which the count of necessary attempts for acquisition is at most a predetermined value, yet these examples are not limiting. The acquirable item information may be configured to include only the total count of items, for each item type, among items for which the count of necessary attempts for acquisition is at most a predetermined value.

A computer is preferably used to function as the battle game server 1. A program containing a description of the processing for achieving the functions of the battle game server 1 is stored in the memory unit of the computer, and the functions are achieved by the central processing unit (CPU) of the computer reading and executing the program.

Although the present invention has been described based on drawings and examples, it is to be noted that various changes and modifications will be apparent to those skilled in the art based on the present disclosure. Therefore, such changes and modifications are to be understood as included within the scope of the present invention. For example, the functions and the like included in the various units and steps may be reordered in any logically consistent way. Furthermore, units or steps may be combined into one or divided. For example, in Embodiments 1 to 3, a separate one of the item information tables 111a to 111c is associated with each user identification number, yet for example a plurality of users may share one of the item information tables 111a to 111c.

REFERENCE SIGNS LIST

1: Battle game server
2: Communication terminal
10: Communication unit
11: Memory unit
12: Information presentation unit
13: Control unit
111a to 111c: Item information table
112: User information table
113: Item data
201 to 219: Box
301 to 325: Cell
501: Information on the total count of items
502: Information on the acquisition count

The invention claimed is:

1. A game control method comprising:
   sending information to a user terminal for displaying, on a display of the user terminal, a screen comprising a plurality of cells, wherein
   an item is associated with each of the cells,
   a rarity value is set to each item,
   a letter is included in each of the cells,
   a color of each of the cells depends on the rarity value of the associated item, and
   the screen further comprises a number of obtainable items for each rarity value;
   receiving a selection indicating a certain cell among the plurality of cells based on an operated position of a touch panel of the user terminal;
   based on the selection, providing to the user terminal the item associated with the certain cell; and
   sending information to the user terminal for displaying an image of the item associated with the certain cell.

2. The method of claim 1, wherein
   the selection is received in response to the operated position of the touch panel of the user terminal corresponding to the certain cell.

3. The method of claim 1, wherein
   a shape of each cell is substantially rectangular.

4. The method of claim 1, wherein
   the item is a battle card or a character composing a deck of a user of the user terminal.

5. The method of claim 1, further comprising
   determining the number of the obtainable items for each rarity value; and
   according to a determination result, sending information to the user terminal for displaying the number of obtainable items for each rarity value on the screen.

6. The method of claim 1, wherein
   the plurality of cells are arranged in a horizontal direction.

7. A server comprising:
   a controller configured to
   send information to a user terminal for displaying, on a display of the user terminal, a screen comprising a plurality of cells, wherein
   an item is associated with each of the cells,
   a rarity value is set to each item,
   a letter is included in each of the cells,
   a color of each of the cells depends on the rarity value of the associated item, and
   the screen further comprises a number of obtainable items for each rarity value;
   receive a selection indicating a certain cell among the plurality of cells based on an operated position of a touch panel of the user terminal;
   based on the selection, provide to the user terminal the item associated with the certain cell; and
   send information to the user terminal for displaying an image of the item associated with the certain cell.

8. The server of claim 7, wherein
   the selection is received in response to the operated position of the touch panel of the user terminal corresponding to the certain cell.

9. The server of claim 7, wherein
   a shape of each cell is substantially rectangular.

10. The server of claim 7, wherein
    the item is a battle card or a character composing a deck of a user of the user terminal.

11. The server of claim 7, wherein the controller is further configured to
    determine the number of the obtainable items for each rarity value; and
    according to a determination result, send information to the user terminal for displaying the number of obtainable items for each rarity value on the screen.

12. The server of claim 7, wherein
    the plurality of cells are arranged in a horizontal direction.

13. A non-transitory computer readable recording medium having stored thereon instructions to be executed on a computer, the instructions causing the computer to perform the steps of:
    sending information to a user terminal for displaying, on a display of the user terminal, a screen comprising a plurality of cells, wherein
    an item is associated with each of the cells,
    a rarity value is set to each item, a letter is included in each of the cells, a color of each of the cells depends on the rarity value of the associated item, and the screen further comprises a number of obtainable items for each rarity value;

receiving a selection indicating a certain cell among the plurality of cells based on an operated position of a touch panel of the user terminal;

based on the selection, providing to the user terminal the item associated with the certain cell; and sending information to the user terminal for displaying an image of the item associated with the certain cell.

14. The non-transitory computer readable recording medium of claim 13, wherein the selection is received in response to the operated position of the touch panel of the user terminal corresponding to the certain cell.

15. The non-transitory computer readable recording medium of claim 13, wherein a shape of each cell is substantially rectangular.

16. The non-transitory computer readable recording medium of claim 13, wherein the item is a battle card or a character composing a deck of a user of the user terminal.

17. The non-transitory computer readable recording medium of claim 13, wherein the instructions further cause the computer to perform the steps of:

determining the number of the obtainable items for each rarity value; and according to a determination result, sending information to the user terminal for displaying the number of obtainable items for each rarity value on the screen.

18. The non-transitory computer readable recording medium of claim 13, wherein the plurality of cells are arranged in a horizontal direction.

* * * * *